United States Patent Office 3,419,538
Patented Dec. 31, 1968

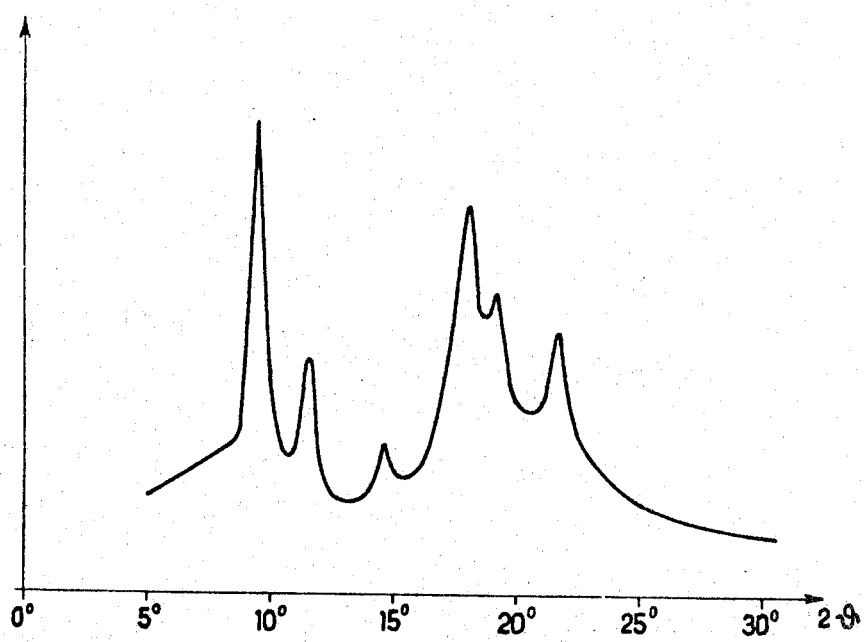

3,419,538
PROCESSES FOR THE PRODUCTION OF HIGHLY CRYSTALLINE POLY(VINYL ALKYL ETHERS)
Giulio Natta, Giorgio Mazzanti, and Gino Dall'Asta, Milan, Italy, assignors to Montecatini Edison S.p.A., Milan, Italy
Continuation of application Ser. No. 303,568, Aug. 21, 1963. This application Oct. 2, 1967, Ser. No. 672,401
Claims priority, application Italy, Aug. 22, 1962, 16,780/62
11 Claims. (Cl. 260—91.1)

ABSTRACT OF THE DISCLOSURE

Vinyl alkyl ethers are polymerized to solid, high molecular weight, highly crystalline polymers which have isotactic structure, by means of catalysts which are fluorides, mixed fluorides-chlorides or mixed fluoride-bromides of transition metals belonging to Groups IV–B—VI–B or VII of the Mendelyeev Periodic Table.

THE PRIOR ART

This application is a continuation of our copending application Ser. No. 303,568, filed Aug. 21, 1963, and now abandoned.

Processes for preparing crystalline polyvinylalkylethers are known. In many cases the known processes are based on the cationic polymerization of vinylalkylethers in homogeneous phase. The catalysts particularly suitable for this type of polymerization are compounds of an acidic nature, usually soluble in the diluting media which, in general, are aliphatic or aromatic hydrocarbons.

An example of this type of polymerization is the one comprising polymerizing the monomer in the presence of boron trifluoride-etherate as the catalyst (see, e.g., C. E. Schildknecht et al., Ind. Eng. Chem 40, 2104 (1948)). Another example involves polymerization of the vinylalkylether in the presence of compounds of the type $(\pi-C_5H_5)_2TiCl_2-AlR_1R_2$, in which $R_1$ and $R_2$ are alkyl groups or chlorine atoms.

A further example is the process comprising polymerizing the monomer with compounds of acidic nature, of which $AlCl(C_2H_5)_2$ is typical.

Those known processes for the polymerization of vinylalkylethers in the homogeneous phase require, in general, very low polymerization temperatures; generally the temperature is comprised between −50° C. and −100° C.

Other processes for polymerizing vinylalkylethers to crystalline polymers are carried out at higher temperatures (at room temperatures or above) with the aid of catalysts of acidic nature, acting in heterogeneous phase. These last-mentioned processes either lead, in general, only to polymers having a low crystallinity or give rather low conversions to polymers the crystallinity of which is still comparatively low. Processes of this kind are those, e.g., which employ catalytic complexes obtained by reaction of organometallic compounds of elements belonging to Groups II or III of the Periodic Table according to Mendelyeev with chlorides, oxychlorides or oxides of metals belonging to Groups IV–B or V–B of said Table, the processes which employ the products of reaction between aluminum selenates and aluminum alkyls or -alkoxides, and the processes which employ compounds of the type $Fe_2(SO_4)_3.H_2SO_4.XH_2O$.

Moreover it is known that halides of various metals (e.g., $BF_3$, $AlCl_3$, $AlBr_3$, $FeCl_3$, $SnCl_4$, $TiCl_4$, $VCl_4$, $BeCl_2$), known as Friedel-Crafts compounds, when used at temperatures higher than 0° C., polymerize vinylalkyl-ethers very quickly to oily, waxy and tacky polymers which appear to be completely amorphous on X-ray examination. The formation of these amorphous polymers is caused by a disordered enchainment of the monomeric units in the polymeric chains. This structural disorder increases remarkably by increasing the polymerization temperature.

Heretofore, no process has been available for polymerizing vinylalkylethers to non-tacky homopolymers the macromolecules of which have a stereoregularity such that they exhibit a crystallinity above 25% when subjected to X-ray examination.

THE PRESENT INVENTION

An object of this invention is to provide a new process for polymerizing vinylalkylethers to solid, high molecular weight homopolymerizates from which, by fractionation, there is obtained a polyvinylalkylether the macromolecules of which show the stereoregular structure isotactic and which exhibits a crystallinity higher than 25% when subjected to X-ray examination.

Another object is to provide the new high molecular weight, highly crystalline polyvinylalkylethers having novel physical properties.

These and other objects are accomplished by the present invention in accordance with which it is surprisingly found that catalysts consisting of halides of certain transition metals, as disclosed in our Italian application No. 26,505 when used under polymerization conditions as described hereinbelow, polymerize vinylalkylethers at temperatures between −50° C. and +120° C., to solid crystalline high molecular weight polymers. In many instances, the crystallinity of the polyvinylalkylethers can be increased remarkably by using the higher temperatures in the range −30° C. to 120° C.

The catalysts used in the present process consist of fluorides, mixed fluorides-chlorides, or mixed fluorides-bromides of transition metals belonging to Groups IV–B, V–B, VI–B, or VIII of the Periodic Table according to Mendelyeev, and which are prepared by the methods disclosed in said Italian application.

At least some of the halogen atoms linked to the transition metal must be fluorine atoms. While other halogens can be present, such as chlorine or bromine, in order to obtain the most valuable polyvinylalkylethers, the number of halogen atoms different from fluorine which are linked to the transition metal should not exceed one-half of the total number of halogen atoms linked thereto. In the preferred embodiment, the fully fluorinated transition metals are used.

The transition metal fluorides, fluorides-chlorides, and fluorides-bromides can be used as such, or in the form of complexes thereof with electron-donors. Useful electron-donors are ethers, amines, and pyridine. The preferred electron-donor is pyridine.

The catalytic transition metal fluorides, mixed fluorides-chlorides, and mixed fluorides-bromides described in the Italian application No. 26,505 have the general formula $$[MX_nF_m].Y_p$$

in which M is the transition metal, X is a chlorine or bromine atom, Y is an electron-donor, preferably pyridine, $n$ is zero or a whole number not greater than one-half of the valency of M, $m$ is a whole number, the sum of $m+n$ being equal to the valency of M, and $p$ is zero or a whole number.

According to the present invention it is found that, among the catalysts comprised in the general formula given, the following are particularly useful for the polymerization of vinylalkylethers to the highly crystalline polymers:

$TiF_4$, $TiF_3Cl$, $TiF_2Cl_2$, $TiF_2Br_2$,
$TiF_3$, $TiF_2Cl$, $TiF_2$, $ZrF_4$, $VF_5$, $VF_4$,
$VF_3Cl$, $VF_2Cl_2$, $VF_3$, $VF_2Cl$,
$CrF_3$, $CrF_2Cl$, $MoF_6$, $MoF_5Cl$, $FeF_3$, $FeF_2$.

On X-ray examination, the listed fluorinated compounds can appear to be highly crystalline, weakly crystalline or amorphous. While all of the listed fluorinated compounds can be used advantageously in the polymerization of vinylalkylethers to crystalline polymers, it has been demonstrated in many cases that, surprisingly, of the listed fluorinated compounds, those which are only weakly crystalline or even amorphous by X-ray examination are particularly suitable for the preparation of polyvinylalkylethers having a high degree of crystallinity and in general good physical and mechanical properties.

The amount of the said fluorinated compounds to be used in the stereospecific polymerization of vinylalkylethers is not critical with respect to the physical properties of the polymers to be obtained but has a considerable influence only on their molecular weight. The vinylalkylether/fluorinated compounds ratios used are preferably comprised between 10:1 and 200:1, by weight.

The polymerization of vinylalkylethers can be carried out according to the present invention, in the presence or absence of solvents. However, due to the strong reaction between vinylalkylethers and fluorinated compounds, which complicates effective control of the reaction, and due to the lower stereospecificity of such as mass reaction, the polymerization of vinylalkylethers according to the present invention is advisably carried out in the presence of a diluent in which the monomer is soluble.

Particularly suitable diluents are aromatic hydrocarbons (e.g., benzene, toluene), aliphatic hydrocarbons (e.g., n-heptane, cyclohexane) and chlorinated aliphatic or aromatic hydrocarbons (e.g., ethyl chloride, chlorobenzene). Mixtures of the different types of diluents specified can be used.

The polymerization of the vinylalkylether is preferably carried out in the temperature range comprised between −50° and +120° C. More particularly, relatively high temperatures (higher than 20° C.) are suitable when the fluorinated compound used is amorphous or weakly crystalline, whereas when fluorinated compounds having a high crystallinity are used as catalysts, polymerization temperatures lower than 40° C. are preferable.

The diluent which is a solvent for the monomer is also, preferably, a solvent for the polymerizate formed. The optimum polymerization temperature depends on the efficiency of the diluent as a solvent for the polymer. The better the solution properties of the diluent for the polymer formed, the lower is the optimum polymerization temperature.

Illustratively, in the case of vinylisobutyl ether, the best results are generally obtained at temperatures of about 60° C. to about 80° C. when n-heptane is used as the diluent; at around 0° C. when the diluent is toluene; and at between 0° C. and −40° C. when the diluent is a mixture of n-heptane and methylene dichloride in, for example, a weight ratio of 10:1 to 3:1.

The processes which lead to crystalline high molecular weight polyvinylalkylethers having the characteristics described in detail hereinbelow, are preferably carried out as follows: one of the aforementioned fluorinated compounds is suspended, under a dry nitrogen atmosphere, in a diluting medium (e.g., an aliphatic hydrocarbon) and, while keeping the suspension in agitation, is heated to the desired polymerization temperature (e.g., +60° C). The desired amount of a vinylalkylether (e.g., vinylisobutyl ether) is then added slowly. In general, a reaction between the fluorinated compound and the vinylalkylether is immediately observed, accompanied by the development of heat and gelling of the suspended product.

The reaction mixture is kept at the polymerization temperature for some hours thus becoming increasingly thick; after the predetermined polymerization time, agitation is stopped and the reaction mixture forms two layers. The very viscous lower layer contains a high proportion of polyvinylalkylether; the supernatant liquid contains a portion of polymer dissolved in the diluent (the aliphatic hydrocarbon). When an aromatic hydrocarbon is used as the diluent, the polymer does not precipitate and remains completely dissolved.

The portion of polymer insoluble in the aliphatic hydrocarbon differs from the soluble polymer, particularly in having a higher molecular weight and a higher degree of crystallinity.

The separation of the polyvinylalkylether into two fractions during the polymerization in aliphatic diluent media is not a phenomenon peculiar to polyvinylisobutylether, but can occur also in analogous polymerizations of other vinylalkylethers, such as vinylmethylether and vinyl-n-butylether.

The two different polyvinylalkylethers formed can be isolated and purified separately or simultaneously. In the latter case, it is sufficient to add an abundant amount of aromatic solvent, such as toluene, in order to dissolve the polymerizate as a whole.

The purification of the polymer is carried out by precipitating the reaction mixture together with the aromatic solvent added, if any. In the case of polymers obtained from vinylalkylethers in which the alkyl group contains more than 2 carbon atoms, this precipitation can be carried out by the addition of an excess of methanol containing a few milliliters of hydrochloric acid.

Since the polymers precipitated in this way usually contain a relatively large amount of residual catalyst, it is convenient to dissolve it again in benzene or toluene, filter the solution repeatedly, and re-precipitate the polymer with methanol in which an antioxidant such as p-phenylphenol has been previously dissolved.

The raw (crude; total) polymer thus obtained exhibts crystallinity when examined under the X-rays. It is heterogeneous however, and consists of various fractions some of which are amorphous, some weakly crystalline, and some having a high degree of crystallinity.

The several fractions can be isolated as distinct entities by subjecting the crude (raw) polymerizate to fractional dissolution. In order to illustrate the fractionation methods without limiting them, we describe hereinbelow a method which can be used for the fractionation of a polyvinylisobutylether obtained as described above. This process can be used, also, as such or after suitable modifications, for the fractionation of other polyvinylalkylethers obtained by the present polymerization processes.

Raw polyvinylisobutylether is extracted for 10–30 hours with boiling acetone in a Kumagawa extractor. Two fractions are thus obtained: one being extracted by the acetone and the other remaining in the paper thimble. The extracted fraction can be isolated either by evaporating off the acetone or by pouring the solution into a methanol excess. This fraction in general is amorphous on X-ray examination. It has a waxy-oily appearance and is more or less tacky. It is soluble in most organic solvents, except lower alcohols and a few others.

The fraction obtained as residue after extraction with boiling acetone on the contrary has the appearance of a non-tacky thermoplastic mass. It appears to be crystalline on X-ray examination; its degree of crystallinity in general is comprised between 10 and 25%. This fraction is insoluble at room temperature in various solvents such as methanol, ethanol, acetone, n-hexane, and acetic acid. However, the acetone fraction extraction residue is also heterogeneous. It consists of various fractions of polymer having different degrees of crystallinity. It can be further fractionated as follows: the polymer is dissolved in boiling methylethylketone until a homogeneous solution is obtained. The catalyst residues, if any, are eliminated by decantation or filtration of the boiling solution. The solution is then left to cool and a portion of the polymer is precipitated in the form of white flocks while another portion remains dissolved. The precipitated portion is separated from the solution by filtration and is then dried at 60° C. under reduced pressure.

This portion insoluble in methylethylketone at room temperature is a very hard, white or yellowish mass. On X-ray examination, it is crystalline, the crystallinity being, in general, comprised between 25 and 50% which is high for a polyvinylalkylether and in comparison with the crystalline polyvinylalkylethers obtainable heretofore.

By using the selected fluorinated compounds under conditions as described herein, we obtain crystallinity higher than 35–40% and a melting temperature higher than 125° C., in general higher than 130° C.; see the accompanying drawing, (FIGURE 1) for a polyvinylisobutylether having a degree of crystallinity due to isotactic stereoregularity of 40%.

Polyvinylisobutylethers having such a high degree of crystallinity have never been described in the literature.

The fraction of polyvinylisobutylether insoluble in methylethylketone has very good physical characteristics. It is insoluble at room temperature in various solvents such as n-hexane, n-heptane, acetone, methylethylketone, diethylether, diisopropylether, methanol, ethanol, n-butanol, acetic acid, ethyl acetate and tetrahydronaphthalene. It is soluble on the contrary in other solvents, such as benzene, tetrahydrofurane and carbon tetrachloride.

It can be extruded into stretchable fibers; the oriented fiber spectrum of the stretched fibers reveals that the high crystallinity exhibited by the polyvinylisobutylether is due to the existence of the particular stereoregular structure isotactic in the macromolecules thereof.

The polyvinylalkylethers having a high degree of crystallinity which are an object of the present invention can be processed by the various conventional methods for processing thermoplastic materials, for instance by pressure molding, injection molding, blowing or extrusion. They can be used as molded or manufactured articles or can be added to other materials in order to improve their properties.

In order to prevent alterations of the polymer due to the action of light or of air oxygen, small amounts of stabilizers can be added to the polymer. Other adjuvants can also be incorporated therein.

The following examples illustrate the invention without limiting its scope.

Example I

In a polymerization vessel provided with a mechanical agitator, a dropping funnel and a gas inlet tube, air is removed and replaced by dry nitrogen.

50 parts by weight of anhydrous n-heptane and 0.3 part by weight of a fluorinated compound obtained from vanadium tetrafluoride and ethylidene fluoride according to example 4 of our Italian patent application No. 26,505 are then introduced into the polymerization vessel. The whole is heated to 60° C. and 11 parts by weight of vinylisobutylether are added dropwise to the mixture, while agitating. The mixture is then kept at 60° C. for 24 hours.

During said period the reaction mixture becomes visibly viscous and portions of gelled polymer precipitate therefrom. The mixture is left to cool and the solution is separated from the precipitated polymer.

The two portions of polymer are coagulated by addition of an excess of methanol, and the polymers are dried under vacuum. From the fraction insoluble in n-heptane, 2.4 parts by weight of a polymer having an intrinsic viscosity of 0.6 and, from the fraction soluble in n-heptane, 5.4 parts by weight of a polymer having an intrinsic viscosity of 0.3 are obtained (the intrinsic viscosities are determined in toluene at 30° C.).

Both fractions show crystallinity on X-ray examination. The total conversion with respect to the monomer used is 71%. The two fractions are mixed together and extracted in an extractor of the Kumagawa type for 30 hours with boiling acetone. The fraction soluble in boiling acetone amounts to 2.6 parts by weight (corresponding to 33% of the total polymer). The fraction insoluble in boiling acetone amounts to 5.2 parts by weight (corresponding to 67% of the total polymer). The two fractions are coagulated with methanol, filtered and dried under reduced pressure at 60° C.

On X-ray examination, the first fraction presents the crystallinity bands typical of isotactic polyvinylisobutylether. Its degree of crystallinity is approximately 22%. The second fraction on the contrary is amorphous.

The fraction insoluble in boiling acetone is dissolved in boiling methylethylketone. The warm solution is filtered and is then left to cool to room temperature. A portion of the polymer precipitates in the form of white flocks which are filtered and dried under reduced pressure at 60° C.; 0.8 part by weight of polymer are thus obtained. This polymer fraction (called "fraction insoluble in methylethylketone") exhibits, when examined by X-ray, a high crystallinity of the type shown in FIGURE 1.

The degree of crystallinity is 40%. The product is isotactic polyvinylisobutylether. The polymer fraction is insoluble at room temperature in various solvents, such as, e.g., n-hexane, n-heptane, acetone, methylethylketone, diethylether, diisopropylether, methanol, ethanol, n-butanol, acetic acid, ethyl acetate and tetrahydronaphthalene. It is soluble in certain other solvents such as benzene, tetrahydrofurane and carbon tetrachloride.

Its intrinsic viscosity, determined in toluene at 30° C., is 0.7. Its melting temperature is 131–134° C.

The fraction of polyvinylisobutylether insoluble in boiling acetone but soluble in methylethylketone at room temperature is isolated by pouring the methylethylketone solution into methanol. It consists of a non-tacky plastic product having a degree of crystallinity of about 14%.

Example 2

The procedure described in Example 1 is used, but the polymerization is carried out at 20° C. instead of 60° C.

1.7 parts by weight of polyvinylisobutylether which is insoluble in the reaction medium (n-heptane), and 7.3 parts by weight of polyvinylisobutylether soluble in the reaction medium are thus obtained. The viscosity of the insoluble polymer, determined in toluene at 30° C., is 0.5.

The total conversion of polyvinylisobutylether is therefore 82%. By extraction with boiling acetone the polymer is fractionated, thus obtaining an insoluble portion A amounting to 1.0 part by weight and a soluble portion B amounting to 7.1 parts by weight. By fractionating portion A with methylethylketone according to the method described in Example 1, there are obtained 1.1 parts by weight of polyvinylisobutylether soluble in methylethylketone and 0.8 part by weight of polyvinylisobutylether insoluble in said solvent, The properties of the single fractions are substantially similar to the analogous ones described in Example 1. Thus, e.g., the fraction insoluble in methylethylketone has a degree of crystallinity of 38% and an intrinsic viscosity, determined in toluene at 30° C., of 0.7.

Example 3

The procedure described in Example 1 is followed, but the polymerization is carried out at 80° C. instead of 60° C.

In total, 7.7 parts of raw polymer (corresponding to a conversion of 70%) having an intrinsic viscosity, determined in toluene at 30° C., of 0.6 are obtained.

By fractionation with boiling acetone as described in Example 1, 3.5 parts of insoluble polymer having a crystallinity of about 23% and 4.2 parts by weight of soluble polymer are obtained.

By further fractionating with methylethylketone the fraction insoluble in acetone according to the method described in Example 1, 1.4 parts of insoluble polymer and 2.1 parts of soluble polymer are obtained.

The properties of the single fractions are substantially equal to those of the analogous fractions described in Example 1.

Thus, for instance, the fraction insoluble in methylethylketone has a degree of crystallinity of 40%, an intrinsic viscosity (determined in toluene at 30° C.) of 0.7, and a melting temperature of 133–138° C.

Example 4

The procedure described in Example 1 is used, but instead of using the fluorinated vanadium compound prepared according to Example 4 of our Italian patent application No. 26,505 as the catalyst, 0.3 part of a fluorinated titanium compound prepared according to Example 3 of the Italian application are used.

1.9 parts by weight of polymer insoluble in n-heptane, having an intrinsic viscosity (determined in toluene at 30° C.) of 0.4, and 6.2 parts by weight of polymer soluble in n-heptane, having an intrinsic viscosity (determined in toluene at 30° C.) of 0.3 are thus obtained.

The total conversion to polymer is therefore 8.1 parts, corresponding to 74% of the monomer used. Both of the fractions show a weak crystallinity on X-ray examination.

By extracting both of the fractions jointly with boiling acetone, 2.0 parts by weight of an acetoneinsoluble fraction and 6.1 parts by weight of an acetone-soluble fraction are obtained. The degree of crystallinity of the insoluble fraction is about 20%.

By fractionating with methylethylketone the fraction insoluble in boiling acetone according to the method described in Example 1, 0.7 part by weight of insoluble fraction and 1.3 parts by weight of methylethylketone-soluble fraction are obtained.

The properties of the single fractions are substantially similar to those described in Example 1. Thus, e.g., the fraction insoluble in methylethylketone has a degree of crystallinity of 34% and an intrinsic viscosity (determined in toluene at 30° C.) of 0.55.

Example 5

The procedure described in Example 1 is adopted, using as the catalyst 0.3 part of the fluorinated titanium compound used in Example 4. The polymerization is carried out at 80° C.

6.5 parts by weight (conversion of 59%) of a polymer partially soluble and partially insoluble in n-heptane are obtained. Its intrinsic viscosity (determined in toluene at 30° C.) is 0.45.

The polymer is extracted with boiling acetone and gives 1.5 parts by weight of polyvinylisobutylether insoluble in boiling acetone, having a degree of crystallinity of about 22%, and 5.0 parts by weight of polyvinylisobutylether soluble in boiling acetone.

The fraction insoluble in boiling acetone is fractionated with methylethylketone according to the method described in Example 1. 0.6 part of insoluble polymer and 0.9 part of soluble polymer are thus obtained.

The properties of the single fractions are substantially similar to those described in Example 1. Thus, e.g., the fraction soluble in methylethylketone has a degree of crystallinity of 36%, an intrinsic viscosity (determined in toluene at 30° C.) or 0.6 and a melting temperature of 127–133° C.

Example 6

The procedure and the catalyst described in Example 4 are used but the polymerization is carried out at −30° C.

3.8 parts of a slightly crystalline polymer insoluble in n-heptane and 4.3 parts of a practically amorphous polymer soluble in the same solvent are obtained.

The total conversion to polymer is 74%.

By fractionating with boiling acetone the fraction insoluble in n-heptane as described in Example 1, 1.8 parts of polymer insoluble in acetone and 2.0 parts of polymer soluble in the same solvent are obtained. The acetone-insoluble fraction has a degree of crystallinity of about 8%.

By further fractionating with methylethylketone the fraction insoluble in boiling acetone as described in Example 1, all of the polymer remains dissolved and a fraction insoluble is methylethylketone is absent.

Example 7

The procedure described in Example 1 is followed with the following changes: instead of using as the catalyst the fluorinated vanadium compound obtained as described in Example 4 of Italian patent application No. 26,505, there is used 0.3 part by weight of the fluorinated titanium compound described in Example 3 of the Italian application; instead of using vinylisobutylether as the monomer to be polymerized, there are used 12 parts by weight of vinylmethylether, and the polymerization is carried out at −20° C.

The crude polymer obtained is substantially insoluble in the diluent medium (n-heptane). It is purified by dissolving it in benzene, filtering the solution, and re-precipitating the polymer by pouring the solution into n-hexane, and is finally dried under reduced pressure.

2.7 parts by weight of polyvinylmethylether having an intrinsic viscosity of 0.55 (determined in toluene at 30° C.) are obtained.

Example 8

The polymerization process is similar to that described in Example 1. The following reactants are used:

100 parts by weight of anhydrous toluene
0.28 part by weight of $TiF_3$ prepared according to Example 3 of Italian patent application No. 26,505
2.4 parts by weight of anhydrous ethyl ether
10 parts by weight of pure vinyl isobutylether The polymerization is carried out at 0° C. for 5 hours. The polymer is isolated as described in Example 1.

8.3 parts by weight (corresponding to a conversion of 83%) of crude polyvinylisobutylether having an intrinsic viscosity (determined in toluene at 30° C.) of 0.7 are thus obtained.

The polymer is extracted with boiling acetone as described in Example 1. The insoluble fraction amounts to 6.6 parts by weight and the soluble fraction amounts to 1.7 parts by weight.

By carrying out a further fractionation of the acetone-insoluble polymer with methylethylketone (see Example 1), 1.6 parts by weight (corresponding to 16% referred to the monomer used) of polyvinylisobutylether insoluble in methylethylketone and having properties very similar to those of the analogous fraction of Example 1 are obtained. The residue of the methylethylketone extraction has an intrinsic viscosity (determined in toluene at 30° C.) of 0.4.

Example 9

The polymerization process is similar to that described in Example 1. The following reactants are used:

100 parts by weight of anhydrous n-heptane
15 parts by weight of methylene chloride
0.30 part by weight of $TiF_3$ prepared according to Example 3 of Italian patent application No. 26,505
10 parts by weight of pure vinylisobutylether.

The purification and fractionation of the polymer are carried out as described in Example 1.

7.9 g. of crude polymer having an intrinsic viscosity (determined in toluene at 30° C.) of 0.2 are thus obtained. From this polymer, by solvent fractionation, the following fractions are obtained:

3.3 parts by weight insoluble in boiling acetone
4.6 parts by weight soluble in boiling acetone
1.2 parts (12% referred to the monomer used) of polyvinylisobutylether are insoluble in methylethylketone.

The fraction non-extractable with methylethylketone has an intrinsic viscosity (determined in toluene at 30° C.) of 0.35; it has a melting temperature of 140–145° C. and a degree of crystallinity of 42%.

Example 10

The polymerization process is similar to that described in Example 1. The following reactants are used:

100 parts by weight of anhydrous n-heptane
15 parts by weight of methylene chloride
2.8 parts by weight of $VF_4$ prepared according to Example 4 of our Italian patent application No. 26,505
10 parts by weight of anhydrous vinylisobutylether.

The polymerization is carried out at 0° C. for 6 hours.
The purification and the fractionation are carried out as described in Example 1, thus obtaining:

8.2 parts by weight of raw polymer having an intrinsic viscosity (determined in toluene at 30° C.) of 0.4 of which:
    2.7 parts by weight are insoluble in boiling acetone,
    5.5 parts by weight are soluble in boiling acetone,
    1.6 parts by weight (16% referred to the monomer used) of polyvinylisobutylether are insoluble in boiling methylethylketone.

The last-mentioned fraction has properties very similar to those of the analogous fraction of Example 9.

Example 11

The polymerization process is similar to that described in Example 1. The following reactants are used:

80 parts by weight of anhydrous n-heptane
40 parts by weight of methylene chloride
0.24 part by weight of $TiF_3$ prepared according to Example 3 of our Italian patent application No. 26,505
10 parts by weight of anhydrous vinylisobutylether.

The polymerization is carried out at −40° C. for 5 hours.
The purification and fractionation of the polymer are carried out as described in Example 1, thus obtaining:

7.1 parts by weight of raw polymers having an intrinsic viscosity (determined in toluene at 30° C.) of 0.9, of which:
    4.6 parts by weight insoluble in boiling acetone
    2.5 parts by weight soluble in boiling acetone
    1.3 parts by weight (13% referred to the monomer used) of polyvinylisobutylether are insoluble in boiling methylethylketone.

The fraction non-extractable with boiling methylethylketone has properties very similar to those of the analogous fraction of Example 9.

The vinylalkylethers which can be polymerized by the present method, to obtain the highly crystalline homopolymers, are those in which the alkyl groups contain from 1 to 18 carbon atoms.

The catalysts used in the present process for polymerizing the vinylalkylethers are prepared by reacting at least one of the compounds $CH_3CHF_2$ and $BF_3$ with a compound of the formula

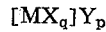

in which M is a transition metal belonging to Groups IVB, VB, VIB or VIII of the Mendelyeev Periodic Table, X is a chlorine or bromine atom, Y is an electron donor, q is the valence of M, and p is zero or a whole number, in an anhydrous chlorinated organic solvent (diluent) and at a temperature between 0° C. and 200° C., preferably between 20° C. and 150° C.

Examples A and B hereinbelow correspond to Examples 3 and 4, respectively of our Italian application No. 26,505.

Example A

A 150 cc. autoclave cooled to −78° C is evacuated, the air is replaced with nitrogen, and the following substances are introduced:

70 cc. of anhydrous ethyl chloride
12 g. (0.078 mol) of titanium trichloride (γ-form), previously washed with n-heptane
17 g. (0.26 mol) of ethylidene fluoride.

The autoclave is closed and agitation is started, while heating to 110° C. After 15 hours of reaction at 110° C. the mixture is cooled to room temperature and all volatile compounds are evaporated under reduced pressure.

8.2 g. of a hazel-brown powder apparently stable in the air are obtained. On X-ray examination, the product shows weak crystallinity bands typical of $TiF_3$. However, it appears to be prevailingly amorphous. The elementary analysis of this reaction product corresponds to a molar ratio Ti:F=1:3. The chlorine content is lower than 0.5% by weight.

Example B

A 150 cc. autoclave cooled at −78° C. is completely evacuated, the air is replaced by nitrogen, and the following substances are then introduced into the autoclave:

80 cc. of anhydrous ethyl chloride
38.6 g. (0.20 mol) of vanadium tetrachloride
33 g. (0.50 mol) of ethylidene fluoride.

The autoclave is closed and agitation is started while heating the contents to 60° C. After 15 hours of reaction at 60° C., the whole is cooled to room temperature and all volatile compounds are evaporated under reduced pressure.

22.5 g. of a light gray powder which is apparently stable in the air are obtained. On X-ray examination, the product appears to be completely amorphous. The elementary analysis of this product corresponds to a molar ratio V:F=1:3.9; the chlorine content is lower than 1% by weight.

Ethylidene fluoride is particularly suitable for use as the fluorinating agent, since it is a stable, non-poisonous, easily handled compound having the following three additional important advantages for use in preparing the catalyst used in the present process:

(1) It exchanges both its fluorine atoms with other halogen atoms.

(2) It permits of obtaining a quantitative fluorination of the transition metal compound without requiring amounts thereof in excess of the stoichiometric amount; and (3) When mixed fluorides-halides are desired, the amount of exchanged chlorine or bromine atoms is controllable because it strictly depends on the relative amount of ethylidene fluoride used.

Boron fluoride also exchanges all of its fluorine atoms with the compounds to be fluorinated and has the advantage of being transformed, during the exchange, into easily volatile compounds. More than one of the fluorinating agents can be used in combination.

The exchange reactions are preferably carried out in the presence of particular diluents having a high vapor pressure at room temperature. Particularly suitable for this purpose are the chlorinated organic compounds, such as, e.g., methyl chloride or ethyl chloride. Other chlorinated aliphatic hydrocarbons such as e.g., n-propyl chloride can be used as the diluent.

The amount of the diluent to be used can be varied within wide limits. It is advisable, however, to use at least one mole of diluent per mole of transition metal halide and preferably from 5 to 50 mols of diluent per mole of transition metal halide to be fluorinated.

The preferred reaction temperatures depend on the particular transition metal halide to be fluorinated and on the particular fluorinating agent used. Thus, if the transition metal halides to be fluorinated consist of liquid compounds easily soluble in the aforementioned diluents and if the fluorinating agent consists of ethylidene fluoride, the exchange reactions can profitably be carried out at temperatures of about 60° C. If the transition metal chlorides to be fluorinated on the contrary consist of solid compounds which are not easily soluble in the aforementioned diluents or if boron trifluoride is used as the fluorinating agent, it is in general more advantageous to operate at temperatures of about 100–150° C.

In some instances, in order to facilitate fluorination at temperatures in the range 20–150° C., it can be useful to complex the transition metal halide to be fluorinated with electron donor compounds such as ethers or pyridine.

The amount of electron donor compound used can vary within the range of 0.5:1 and 20:1 by mols. Preferred ratios of the electron donor to transition metal halide to be fluorinated are comprised between 1:1 and 5:1 by mols.

Transition metal halides which can be fluorinated according to the present invention are those of metals belonging to Groups IV–B, V–B, VI–B and VIII of the Periodic Table according to Mendelyeev. Particularly suitable are the halides of titanium, zirconium, vanadium, chromium, molybdenum tungsten, iron, nickel and cobalt.

As halides, either chlorides or bromides can be used but chlorides are more suitable because they form, when reacted with the present fluorinating agent, exchange compounds which can be removed more easily.

The halides of the aforementioned transition metals can be used in all the valency states of the metal therein contained. Illustratively, the transition metal halides which can be fluorinated to include: titanium tetrachloride, titanium trichloride, titanium dichloride, titanium tetrabromide, zirconium tetrachloride, vanadium tetrachloride, vanadium trichloride, vanadium dichloride, vanadium tribromide, chromium trichloride, chromium dichloride, molybdenum pentachloride, molybdenum trichloride, tungsten hexachloride, iron trichloride, iron dichloride, nickel dichloride, cobalt dichloride, and cobalt dibromide.

The number of halogen atoms exchanged with fluorine depends on the amount of fluorinating agent used. Two or more halogen atoms can be exchanged until all the halogen atoms of the starting halide have been substituted by fluorine atoms.

As will be evident, changes can be made in practicing this invention without departing from the spirit thereof. Therefore, we intend to include in the scope of the appended claims all such variations and modifications as will be apparent from the description and illustrative examples given herein.

What is claimed is:
1. A process for the polymerization of vinylalkylethers, in which the alkyl groups contain from 1 to 4 carbon atoms, to solid, high molecular weight homopolymers macromolecules of which, on X-ray examination, exhibit a crystallinity of at least 35%, said process comprising polymerizing the ethers in contact with a catalytic compound having the general formula

$$MX_nF_m$$

in which M is a transition metal belonging to Groups IV–B and V–B of the Mendelyeev Periodic Table, X is a halogen atom selected from the group consisting of chlorine and bromine; $n$ is selected from the group consisting of zero and whole numbers not higher than one-half the valency of M, $m$ is a whole number, the sum of $m+n$ being equal to the valency of M, the polymerization being carried out in the range −50° C. to +120° C. and selected so that it is higher than 20° C. when the fluorinated transition metal is amorphous to weakly crystalline and lower than 40° C. when the fluorinated transition metal is highly crystalline.

2. The process according to claim 1, further characterized in that the polymerization is carried out at a temperature comprised between −40° C. and +80° C.

3. The process according to claim 1, characterized in that the vinylalkylether $MX_nF_m$ ratio is comprised between 10:1 and 200:1.

4. The process according to claim 1, characterized in that in the formula for the catalyst M is selected from the group consisting of titanium and vanadium.

5. The process according to claim 4, further characterized in that the catalyst is $VF_4$.

6. The process according to claim 4, further characterized in that the catalyst is $TiF_3$.

7. The process according to claim 1, further characterized in that the vinylalkylether polymerized is vinylmethylether.

8. The process according to claim 1, further characterized in that the vinylalkylether polymerized is vinylisobutylether.

9. The process according to claim 1, characterized in that the polymerization is carried out in the presence of a diluent selected from the group consisting of aliphatic, chlorinated aliphatic, aromatic and chlorinated aromatic hydrocarbons.

10. The process according to claim 9, further characterized in that the diluent is selected from the group consisting of n-heptone, toluene, and mixtures of toluene and methylene chloride.

11. The process according to claim 1, characterized in that the crude polymerizate is fractionated by:
 (a) extracting it with boiling acetone;
 (b) dissolving the residue of extraction (a) in boiling methylethylketone;
 (c) filtering the boiling solution obtained in (b); and
 (d) separating the fraction precipitated at room temperature by methylethylketone.

References Cited
UNITED STATES PATENTS

| | | | |
|---|---|---|---|
| 3,157,626 | 11/1964 | Heck | 260—91.1 |
| 3,159,613 | 12/1964 | Vandenberg | 260—91.1 |

FOREIGN PATENTS

| | | |
|---|---|---|
| 923,386 | 4/1963 | Great Britain. |
| 1,227,663 | 3/1960 | France. |

JOSEPH L. SCHOFER, *Primary Examiner.*

M. B. KURTZMAN, *Assistant Examiner.*

U.S. Cl. X.R.

252—441